No. 633,813. Patented Sept. 26, 1899.
T. CROSTON.
ROTARY ENGINE.
(Application filed Nov. 1, 1898.)
(No Model.) 3 Sheets—Sheet 1.

WITNESSES:
INVENTOR
BY
ATTORNEYS.

No. 633,813. Patented Sept. 26, 1899.
T. CROSTON.
ROTARY ENGINE.
(Application filed Nov. 1, 1898.)
(No Model.) 3 Sheets—Sheet 2.

WITNESSES:

INVENTOR
BY
ATTORNEYS.

No. 633,813. Patented Sept. 26, 1899.
T. CROSTON.
ROTARY ENGINE.
(Application filed Nov. 1, 1898.)
(No Model.) 3 Sheets—Sheet 3.
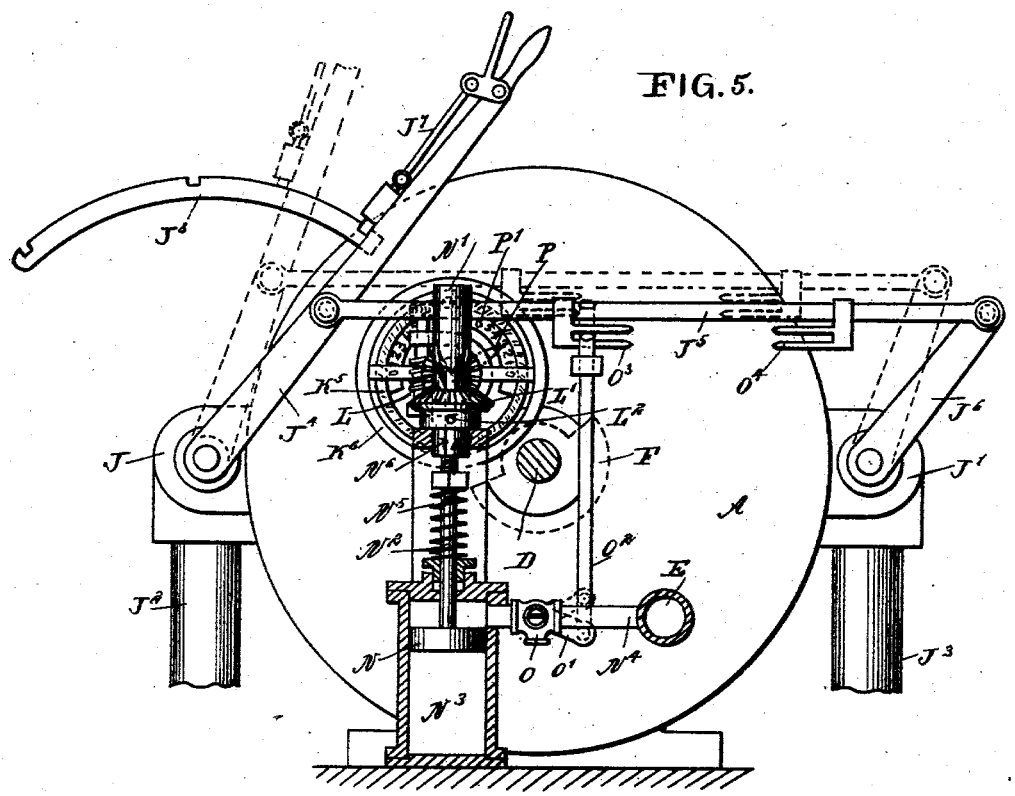
FIG. 5.
FIG. 7.
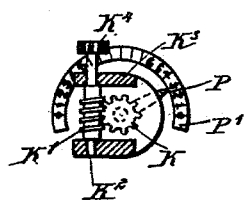
FIG. 8.
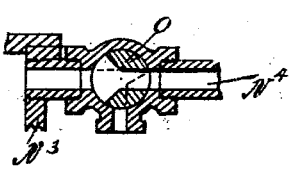
WITNESSES:
FIG. 6.
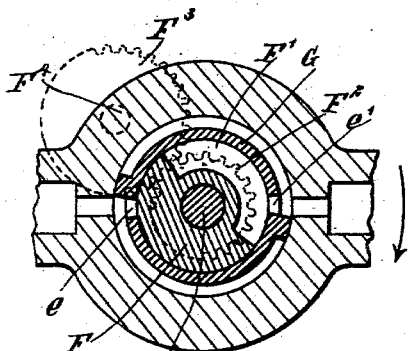
FIG. 9.
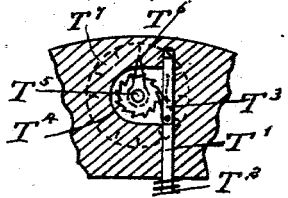
FIG. 10.
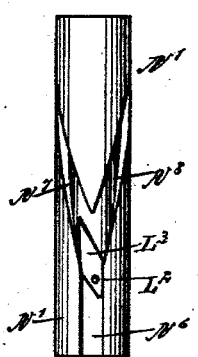
INVENTOR
BY
ATTORNEYS.
THE NORRIS PETERS CO., PHOTO-LITHO., WASHINGTON, D. C.

UNITED STATES PATENT OFFICE.

THOMAS CROSTON, OF HOQUIAM, WASHINGTON.

ROTARY ENGINE.

SPECIFICATION forming part of Letters Patent No. 633,813, dated September 26, 1899.

Application filed November 1, 1898. Serial No. 695,197. (No model.)

*To all whom it may concern:*

Be it known that I, THOMAS CROSTON, of Hoquiam, in the county of Chehalis and State of Washington, have invented a new and Improved Rotary Engine, of which the following is a full, clear, and exact description.

The object of the invention is to provide a new and improved rotary engine arranged to utilize the motive agent to the fullest advantage, to govern the admission of the steam to the cylinder and piston according to and from the load by way of the driving-shaft, to govern the steam cut-off according to the boiler-pressure, and to permit of conveniently reversing the engine whenever desired.

The invention consists of novel features and parts and combinations of the same, as will be described hereinafter, and then pointed out in the claims.

Reference is to be had to the accompanying drawings, forming a part of this specification, in which similar characters of reference indicate corresponding parts in all the figures.

Figure 1:
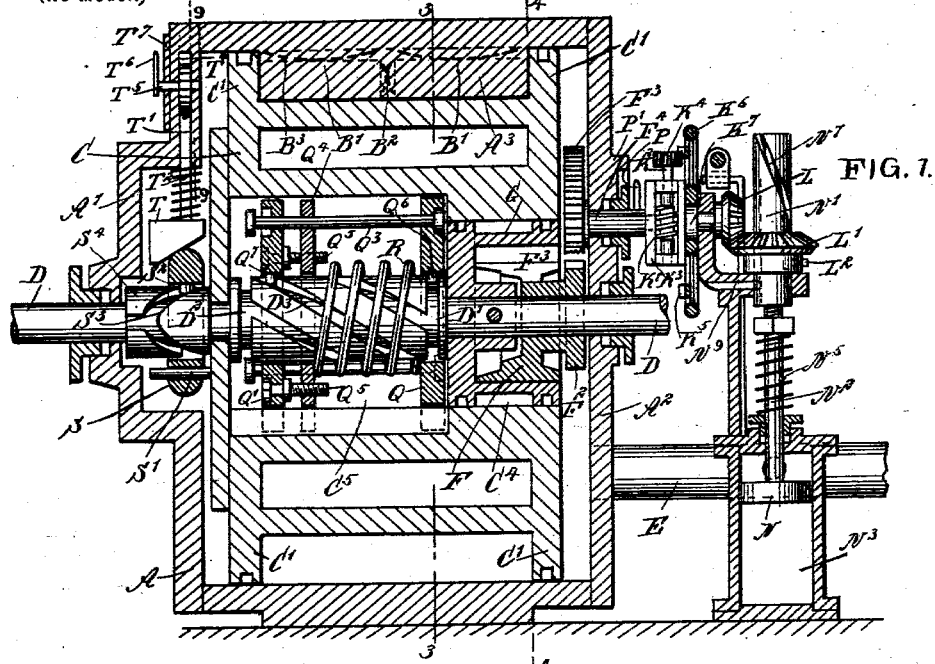
Figure 2:
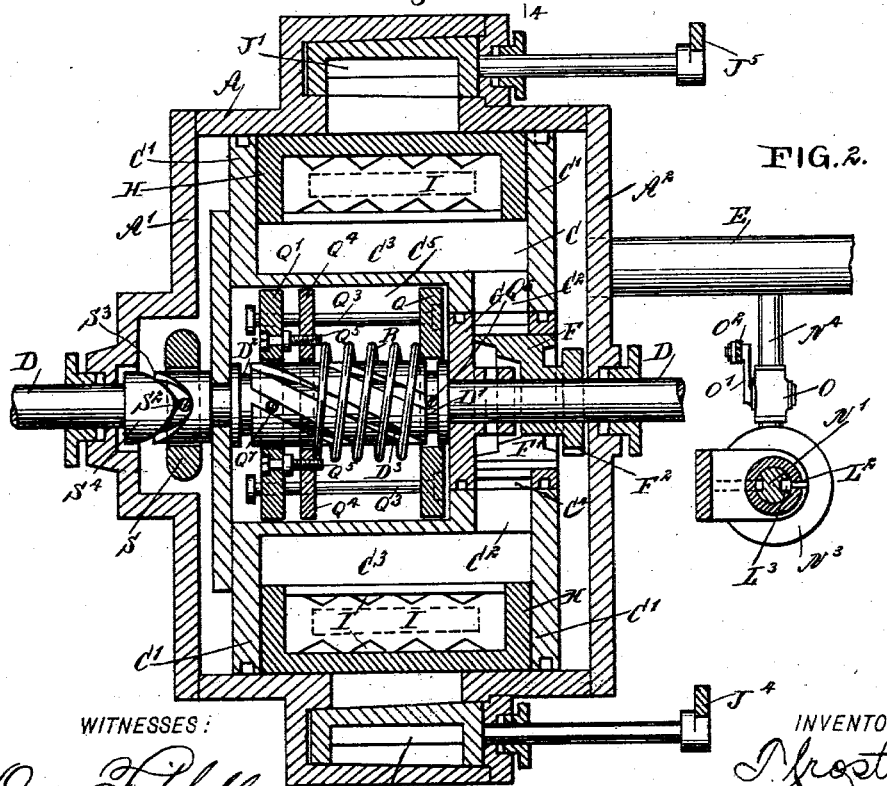
Figure 3:
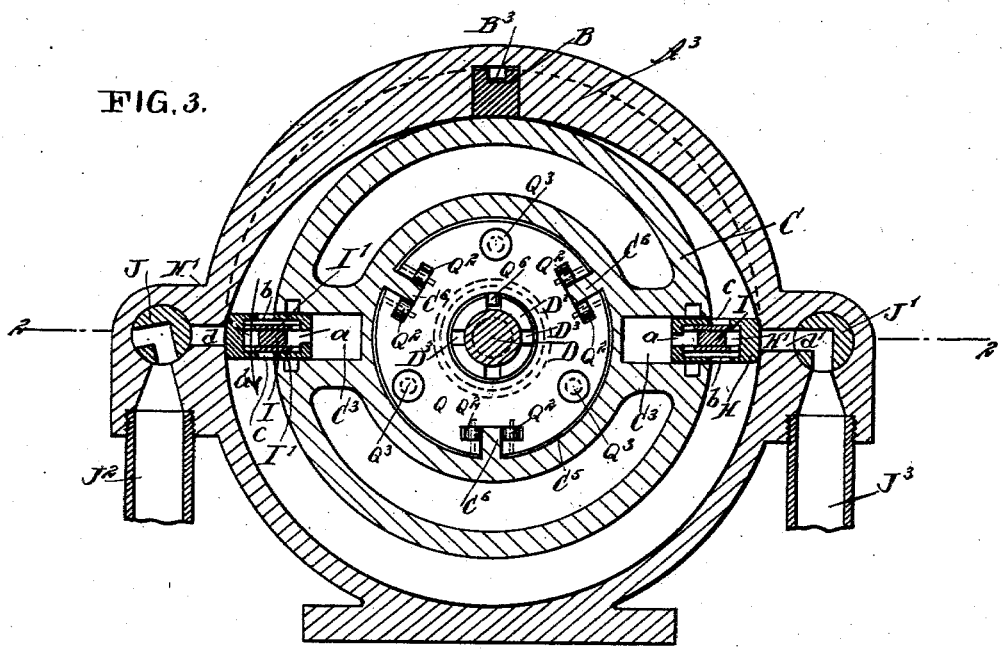
Figure 4:
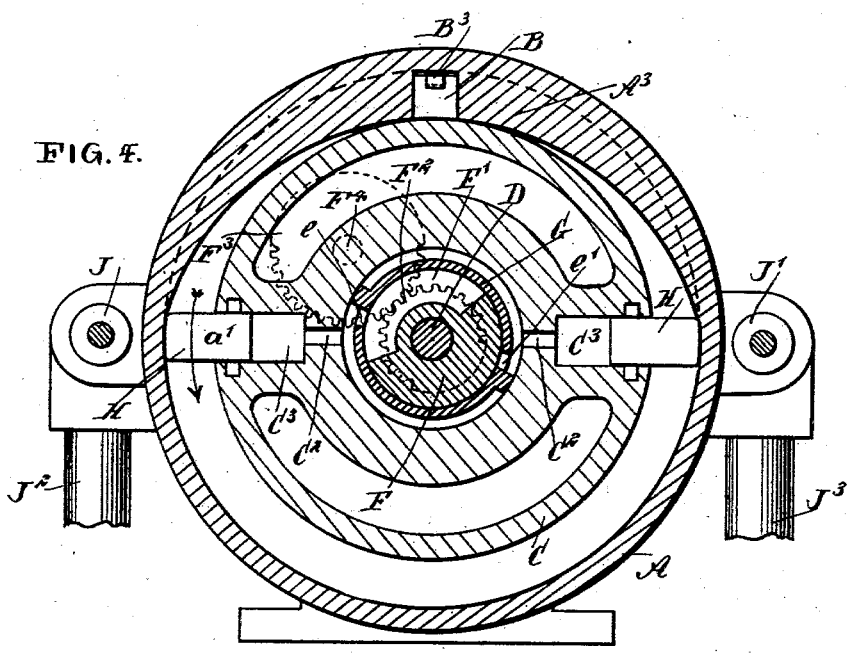

Figure 1 is a sectional side elevation of the improvement. Fig. 2 is a sectional plan view of the same on the line 2 2 of Fig. 3. Fig. 3 is a transverse section of the same on the line 3 3 of Fig. 1. Fig. 4 is a similar view of the same on the line 4 4 of Fig. 1. Fig. 5 is an end view of the improvement with parts of the admission-regulator in section. Fig. 6 is a cross-section of the valve-gear in a reversed position. Fig. 7 is an enlarged sectional side elevation of the reversing-indicator with parts in section. Fig. 8 is an enlarged sectional side elevation of the valve for the admission-regulator. Fig. 9 is a cross-section of the load-indicator, the section being taken on the line 9 9 of Fig. 1; and Fig. 10 is an enlarged side elevation of the piston-rod for the admission-regulator.

The improved automatic rotary engine is provided with a cylinder A, having heads A' A² and an abutment portion A³, in which is fitted a spring-pressed packing B, engaging the peripheral surface of a cylindrical piston C, mounted to rotate in the cylinder A and loosely on the main driving-shaft D, the latter having a yielding connection with the said piston, as hereinafter more fully described, to govern the admission of steam to the cylinder and piston, according to the load, by way of said driving-shaft D. The packing B extends between the side flanges C' of the piston C, and said packing is preferably made in four sections B', (see dotted lines in Fig. 1,) pressed lengthwise by springs B² against the flanges C' and inward against the peripheral surface of the piston C by springs B³. A supply-pipe E, connected with a suitable source of steam-supply, opens into the cylinder at the head A² between the latter and one of the piston-flanges C', the steam then passing from this end of the cylinder through a valve-seat F into a cylindrical valve G, secured to the shaft D and mounted to turn in the central bore C⁴, formed at one end of the piston C. The steam passes from the valve G through passages C² into chambers C³, formed diametrically opposite each other in the peripheral surface of the piston C, each chamber containing a piston-head H, pressed outward in frictional contact with the inner surface of the cylinder A by the live steam passing into the chamber C³ and pressing against the inner end of said piston-head. The latter is made hollow and contains a port $a$, connecting the chamber C³ with a valve-chamber H', connected by ports $b$ and $c$ with the interior of the cylinder at opposite sides of the piston-head. A valve I in each piston-head is provided with top and bottom serrated flanges I', adapted to close or open the ports $b$ and $c$, the valve being held in either position by the pressure of the live steam over the port exposed to the exhaust, as will be readily understood by reference to Fig. 3. Thus, as shown at the right in Fig. 3, the valves I close the port $c$ and open the port $b$, so that live steam can pass from the chamber C³ by way of the ports $a$ and $b$ into the cylinder A and press against the piston-head at the time the latter is moving into a left-hand position to rotate the piston in the direction of the arrow $a'$. (See Fig. 4.) The cylinder A is connected at opposite sides by exhaust-ports $d$ $d'$ with exhaust-valves J J', respectively, under the control of the engineer, and connected with exhaust-pipes J² J³, respectively. The stem of the valve J is provided with a hand-lever J⁴, connected by a link J⁵ with an arm J⁶ on the stem of the other valve J', so that when the hand-lever J⁴ is thrown over by the engineer the positions of the exhaust-valves J J' are reversed. As shown in Fig. 3, the valve J is in a closed position, and consequently inactive, while the valve J' is open, the exhaust-steam passing through it when the piston C travels in the direction of the arrow $a'$. The hand-lever $J^4$ is provided with a locking-lever $J^7$, adapted to be locked on a notched segment $J^8$ for holding the lever in proper position.

The valve-seat F is provided with a cut-out portion F', and the cylindrical cut-off valve G, rotating on said valve-seat and rigidly secured to the shaft D, is provided with two oppositely-arranged ports $e e'$, adapted to connect the cut-out portion F' of the valve-seat with the corresponding passage $C^2$ to allow the steam to pass from the end of the cylinder through the cut-out portion F' and the port $e$ or $e'$ to the passage $C^2$ before the port $e$ or $e'$ leaves the cut-out portion and closes on the peripheral part of the said valve-seat. The steam then admitted into the cylinder to act on the corresponding piston-head acts expansively, and the steam in front of the piston-head exhausts through the port $d'$, exhaust-valve J', and the exhaust-pipe $J^3$.

By setting the steam cut-off at one-eighth of a revolution of the piston C the load is thrown on the engine, when the load-cut-off valve will travel in an opposite direction, as shown by the arrow in Fig. 6, until the load-spring R hereinafter further described equals the power thrown on the engine, and so on until the cut-off occurs at one-half revolution of the working travel of the piston-head H.

It is evident that by shifting the position of the valve-seat F from that shown in Fig. 4 to the position shown in Fig. 6 steam can be admitted to the left-hand or right-hand side of the cylinder A by way of the chambers $C^3$ and piston-heads A' $A^2$, as explained, so that the engine can be run in either a forward or reverse direction. For this purpose the valve-seat F forms a reversing-valve and is provided with a gear-wheel $F^2$ in mesh with a gear-wheel $F^3$, secured on a shaft $F^4$, journaled in the head $A^2$ and provided at its outer end with a worm-wheel K (see Fig. 7) in mesh with a worm K', secured or formed on a shaft $K^2$, mounted to turn in suitable bearings in a frame $K^3$, and carrying at one end a pinion $K^4$ in mesh with a gear-wheel $K^5$, formed on the edge of a hand-wheel $K^6$ under the control of the engineer for turning said hand-wheel and rotating the worm K', worm-wheel K, shaft $F^4$, and gear-wheels $F^3$ $F^2$ to rotate the valve-seat F, so as to move the same into proper position for running the engine forward or backward. The hand-wheel $K^6$ is journaled loosely on a shaft $K^7$ close to the bevel-wheel L.

The bevel gear-wheel L is secured on the shaft $K^7$ and is in mesh with a bevel gear-wheel L', mounted loosely on the enlarged end N' of a piston-rod $N^2$, carrying a piston N, fitted to slide in a cylinder $N^3$, connected by a branch pipe $N^4$ with the steam-supply pipe E, so that the motive agent can pass under boiler-pressure into the supply-pipe E and into the upper end of the cylinder $N^2$ to press on the piston N and force the same in a downward direction against the tension of the spring $N^5$, held on the stem $N^2$. A nut on the latter serves to regulate the tension of the said spring. In the hub of the bevel gear-wheel L' is secured a pin $L^2$, carrying a diamond-shaped shoe $L^3$, (see Fig. 10,) mounted to travel in a vertically-disposed slot $N^6$, formed in the enlarged end N' of the piston-rod $N^2$, said slot terminating in diverging slots $N^7$ $N^8$, forming, with the slot $N^6$, a Y-shaped slot, as will be readily understood by reference to Fig. 10. A pin $N^9$ in a fixed portion of the bearing or guideway for the piston-rod N, engages a vertically-disposed slot in the enlarged part N', so as to prevent the latter from turning, but allow an up-and-down movement thereof.

Now it is evident that when the boiler-pressure increases beyond a normal pressure then the piston N is forced downward beyond its normal position, causing the piston-rod $N^2$ and its enlargement N' to move in a like direction, so that either of the grooves $N^7$ or $N^8$ turns the bevel gear-wheel L' by means of the shoe $L^3$, and consequently a rotary motion is given to the bevel gear-wheel L, which turns the shaft $K^7$ and frame $K^3$ and turns the shaft $F^4$ by the worm K' and worm-wheel K. The rotary motion of the shaft $F^4$ is transmitted by the gear-wheels $F^3$ $F^2$ to the valve-seat F, so that the latter changes position relatively to the cut-off valve G according to the increase in the boiler-pressure, and consequently the cut-off takes place sooner on an increase of pressure. A like result in a reverse direction takes place when the boiler-pressure decreases, as the spring $N^5$ pushes the piston-rod $N^2$ upward, and the gear-wheel L' is turned in the opposite direction to move the valve-seat F in such position relative to the cut-off valve G that the cut-off takes place later and more steam is admitted to the cylinder.

In the branch pipe $N^4$ is a valve O, arranged to normally connect the branch pipe $N^4$ with the interior of the cylinder, as shown in Figs. 5 and 8; but the valve-body has an outlet to the open air, so that when it is desired to reverse the engine the said cylinder is connected with the outer air, while the steam is cut off from the cylinder to permit of conveniently reversing the engine. The valve O is actuated from the link $J^5$, and for this purpose the stem of the valve is provided with an arm O', connected by a link $O^2$ with either the fork $O^3$ or the fork $O^4$, secured on said link $J^5$. When the lever $J^4$ is thrown into the position shown in dotted lines in Fig. 5, then the link $J^5$ by the fork $O^3$ lifts the link $O^2$, so that a pull is exerted on the arm O' and the valve O is shifted to disconnect the cylinder $N^3$ from the supply-pipe E. The spring $N^5$ now pushes the piston N into an uppermost position, so that the shoe $L^3$ stands in the vertical slot $N^6$ and holds the bevel gear-wheel $L'$ against rotation to permit of shifting the valve-seat F by means of the hand-wheel $K^6$, turned by the operator. When the engine is reversed and the lever $J^4$ is thrown over to the left on the segment $J^8$, then the other fork $O^4$ engages the link $O^2$ and moves the valve O into proper position.

On the shaft $F^4$ is secured a pointer P, indicating on a graduation $P'$, fixed on the outside of the cylinder-head $A^2$, so as to indicate the position of the valve-seat F relatively to the cut-off valve G. (See Fig. 7.)

The piston C is provided with a bore $C^5$, somewhat larger than the bore $C^4$ containing the cut-off valve G, and in this bore is arranged a yielding connection between the shaft D and the piston C. As illustrated in the drawings, the yielding connection referred to is provided with two disks Q Q', held loosely on the shaft D and provided with friction-rollers $Q^2$, engaged by projections $C^6$, extending from the wall of the bore $C^5$ inwardly, as is plainly shown in Fig. 3, so that when the piston C is rotated the projections carry the disks Q Q' along. The disks Q Q' are loosely connected with each other by rods $Q^3$, arranged to permit the disks to slide toward or from each other for the purpose hereinafter more fully described. The disk Q' supports a second disk $Q^4$ by means of screw-rods $Q^5$, mounted to turn loosely in the disk Q' and screwing in the disk $Q^4$ to move the latter closer to or farther from the disk Q' and regulate the tension of a spring R, coiled on the shaft D and extending between the disk $Q^4$ and the disk Q. The disks Q Q' are provided at their hubs with inwardly-projecting pins $Q^6$ $Q^7$, respectively, adapted to engage annular grooves $D'$ $D^2$, formed on the shaft D, and also spiral grooves $D^3$, extending between the annular grooves D $D'$. The rods $Q^3$ are of such a length that the disks Q Q' cannot move farther apart, so that one of the disks has its pin in an annular groove, while the other disk has its pin in a spiral groove. For instance, as shown in Figs. 1 and 2, the disk Q has its pin $Q^6$ in the annular groove $D'$, while the other disk Q' has its pin $Q^7$ in a spiral groove $D^3$. When the engine is reversed, then the pin $Q^7$ of the disk Q' extends in the annular groove $D^2$, while the pin $Q^6$ of the disk Q engages one of the spiral grooves $D^3$.

Now when the load on the shaft D increases beyond a normal load then the shaft D drags relatively to the piston C, and in doing so the disk Q' (see Figs. 1 and 2) is caused to travel inward toward the disk Q at the time the pin $Q^7$ causes the piston C to rotate to bring the piston in such relative position to the cut-off valve G that the cut-off takes place later, so as to allow more steam to pass into the cylinder for overcoming the increase in the load, and in case the load decreases the disk Q' moves outwardly by the tension of the spring R, and consequently said disk tends to turn the piston C faster to cut off sooner on the valve G and reduces the amount of steam passing into the cylinder. In either case the spring R tends to equalize the discrepancy between the pressure of the steam in the cylinder and the load connected with the shaft D, so that the disk Q' moves correspondingly, and consequently the admission of steam to the cylinder and piston is governed according to and from the load by way of the driving-shaft. When the engine is reversed, the action is the same as above described, the only difference being that it is the disk Q that moves toward and from the other disk Q', but against the tension of the spring R, for the purpose set forth.

In order to indicate the position of the shaft D relatively to the piston by the yielding connection above referred to, I provide a ring S, engaged by a pin $S'$, carried on the piston C. The pin $S'$ is provided with an inwardly-projecting pin $S^2$, engaging a spiral groove $S^3$, formed in a cam $S^4$, secured to the shaft D within the cylinder A next to the head $A'$. The ring S engages a wedge T, provided with a rod $T'$, fitted to slide in suitable bearings in the head $A'$ and pressed on by a spring $T^2$ for holding the wedge T in frictional contact with the ring. The upper end of the rod $T'$ carries a pawl $T^3$ (see Figs. 1 and 9) in mesh with a cog-wheel $T^4$, secured on a shaft $T^5$, mounted to turn in suitable bearings in the said head $A'$. On the outer end of the shaft $T^5$ is secured a pointer $T^6$, indicating on a graduation $T^7$ on the outer face of the head $A'$.

Now when the shaft D rotates slower than the piston C then the projection $S^2$, traveling in the cam-groove $S^3$, causes the ring S to slide outward on the pin $S'$, and in doing so the ring pushes the wedge T outward against the tension of the spring $T^2$, and the outward movement of the wedge causes the rod $T'$ and pawl $T^3$ to turn the ratchet-wheel $T^4$ and shaft $T^5$ and move the pointer $T^6$ on the graduation $T^7$ to indicate the difference in position between the shaft D and the piston C.

Having thus fully described my invention, I claim as new and desire to secure by Letters Patent—

1. A rotary engine, provided with a main shaft, a cylinder, a piston mounted therein loosely on the main shaft, a disk connected with the piston to rotate therewith, a guide secured to the shaft and extending obliquely in relation to its axis, another disk mounted to rotate with the piston and having a projection engaging the said oblique guide, said second-named disk being movable longitudinally of the shaft, toward and from the other disk, and a spring located between the two disks.

2. A rotary engine, provided with a main shaft, a cylinder, a piston mounted therein loosely on the main shaft, a disk connected with the piston to rotate therewith, a guide secured to the shaft and extending obliquely in relation to its axis, another disk mounted to rotate with the piston and having a projection engaging the said oblique guide, said second-named disk being movable longitudinally of the shaft, toward and from the other disk, a cut-off valve positively connected with the shaft and coöperating with ports in the piston, and a spring located between the two disks.

3. A rotary engine, provided with a cylinder, a piston mounted therein, a cut-off valve for the steam to said cylinder and piston, a main driving-shaft controlling said valve, a yielding connection between said shaft and piston, and a reversing-valve operating in conjunction with the admission-valve and under the control of the engineer, substantially as shown and described.

4. A rotary engine, provided with a cylinder, a piston mounted therein, a cut-off valve for the steam to said cylinder and piston, a main driving-shaft controlling said valve, a yielding connection between said shaft and piston, said yielding connection comprising disks engaged by and carried around by said piston, one of the disks being fitted to slide in spiral grooves on said shaft, and a spring pressing the disks apart, substantially as shown and described.

5. A rotary engine, provided with a cylinder, a piston mounted therein, a cut-off valve for the steam to said cylinder and piston, a main driving-shaft controlling said valve, a yielding connection between said shaft and piston, said yielding connection comprising disks engaged by and carried around by said piston, one of the disks being fitted to slide in spiral grooves on said shaft, a spring pressing the disks apart, and means for regulating the tension of said spring, substantially as shown and described.

6. A rotary engine, provided with a cylinder, a piston mounted therein, a cut-off valve for the steam to said cylinder and piston, a main driving-shaft controlling said valve, a yielding connection between said shaft and piston, said yielding connection comprising disks engaged by and carried around by said piston, one of the disks being fitted to slide in spiral grooves on said shaft, a spring pressing the disks apart, and a loose connection between said disks, for shifting the same simultaneously and automatically on reversing the engine, substantially as shown and described.

7. A rotary engine, provided with a piston having a piston-head with ports on opposite sides, and a valve in said piston-head, for closing one port and opening the other, the valve being controlled by the pressure of the steam, substantially as shown and described.

8. A rotary engine, provided with a piston having a piston-head with ports on opposite sides, and a valve in said piston-head, for closing one port and opening the other, the valve being controlled by the pressure of the steam passing from the interior of the piston through a port into the valve-chamber in the piston-head, substantially as shown and described.

9. A rotary engine, provided with a cylinder, a piston mounted to turn therein, a main driving-shaft on which the piston rotates loosely, a yielding connection between the said shaft and the said piston, and an indicator connected with the said shaft and piston, to indicate the differential position of the two, substantially as shown and described.

10. An engine, comprising a main shaft, a rotary piston loose on said shaft, a valve rigidly secured to the shaft and controlling ports of the piston, and a yielding connection between the shaft and piston.

THOMAS CROSTON.

Witnesses:
WM. B. OGDEN,
H. BARKER.